(12) United States Patent
Hoshino et al.

(10) Patent No.: US 6,453,323 B1
(45) Date of Patent: Sep. 17, 2002

(54) RESOLVING LONG-BUSY CONDITIONS FOR SYNCHRONIZED DATA SETS

(75) Inventors: Takeshi Hoshino, Sakura (JP); Hiroaki Katahira, San Jose, CA (US); Fumitoyo Kawano, Tokyo (JP); Francis Joseph Ricchio, San Jose, CA (US); Shinji S. Satoh, Urayasu; Takashi Ueyama, Fujisawa, both of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/351,961

(22) Filed: Jul. 12, 1999

(51) Int. Cl.[7] ............................................. G06F 12/00

(52) U.S. Cl. ...................... 707/201; 707/10; 707/202; 709/248; 714/100; 714/1

(58) Field of Search ................................. 707/201, 202, 707/204, 1, 9, 200, 203; 714/100, 1, 13–16, 799, 814, 19–21; 709/248, 200

(56) References Cited

U.S. PATENT DOCUMENTS

| | | | |
|---|---|---|---|
| 5,469,560 A | | 11/1995 | Beglin .......................... 395/439 |
| 5,692,155 A | * | 11/1997 | Iskiyan et al. .................. 395/489 |
| 5,758,190 A | | 5/1998 | Johnson et al. ................ 395/868 |
| 5,768,620 A | | 6/1998 | Johnson et al. ................ 395/835 |
| 5,813,042 A | | 9/1998 | Campbell et al. .............. 711/159 |
| 5,968,182 A | * | 10/1999 | Chen et al. ...................... 714/5 |
| 6,088,815 A | * | 7/2000 | West et al. ...................... 714/15 |
| 6,304,980 B1 | * | 10/2001 | Beardsley et al. ............... 714/6 |

FOREIGN PATENT DOCUMENTS

| | | |
|---|---|---|
| JP | 8-241271 | 9/1996 |
| JP | 9-28862 | 11/1997 |
| WO | WO 98/35468 | 8/1998 |

OTHER PUBLICATIONS

IBM TDB (Long Busy Conditions, vol. 32, No. 10B, pp., 419–420, Mar. 1990).*
IBM Technical Disclosure Bulletin, "Efficient External Sorting Technique for Non–Synchronous DASD Operation", vol. 36, No. 10, Oct. 1993, pp 213.
DW Cornell, et al., "Analysis of Multi–system Function Request Shipping", International Conference on Data Engineering, (Cat. No. 86CH2261-6), pp. 282–291, Published: Washington, DC, USA, 1986 *IEEE Comput.Soc.Press*, (Abstract).
PS Yu et al., "On Coupling Partitioned Database Systems", 6th International Conference on Distributed Computing Systems Proceedings (Cat. No. 86CH2293-3), pp. 148–157, Published: Washington, DC, USA, 1986, *IEEE Comput. Soc.Press*, (Abstract).

* cited by examiner

*Primary Examiner*—Kim Vu
*Assistant Examiner*—Joon Hwan Hwang
(74) *Attorney, Agent, or Firm*—Gates & Cooper LLP

(57) ABSTRACT

A method, apparatus, and article of manufacture for resolving long-busy conditions for synchronized data sets. A long-busy condition is detected in a first one of the synchronized data sets. Further access to the first data set is prevented and all subsequent accesses are directed to another, available, second one of the data sets during the long-busy condition. All updates that are made to the second data set during the long-busy condition are identified and stored in a data structure. An untimed read operation is used to determine when the long-busy condition has cleared. Once the long-busy condition is cleared, the first data set is placed into a recovery mode, wherein the identified updates are applied to the first data set. During the recovery mode, the first data set is read-inhibited to prevent read accesses thereto, but the first data set is write-enabled to allow write access thereto. Upon completion of the recovery mode, the first and second data sets are re-synchronized and normal processing can resume.

24 Claims, 8 Drawing Sheets

RESOLVING LONG-BUSY CONDITIONS FOR SYNCHRONIZED DATA SETS

BACKGROUND OF THE INVENTION

1. Field of the Invention

The present invention relates generally to computerized methods for accessing synchronized data sets, and in particular, to resolving long-busy conditions for synchronized data sets.

2. Description of Related Art

It is well known in the art to use database management systems, such as IBM's IMS™ (Information Management System) database management system (DBMS), to manage computerized databases. Indeed, IMS™ has been used for decades and remains in use today.

To enhance performance and database integrity, IMS™ supports the use Multiple Area Data Sets (MADS). MADS are comprised of multiple synchronized copies of the same Area Data Set (ADS) stored on multiple data storage devices. Generally, each ADS is read in a "round-robin" fashion to enhance performance, but all ADS's are written at the same time, to ensure synchronization among the multiple ADS's.

IMS™ Fast Path (FP) is a set of functions used by application programs that require good response time characteristics and that may have large transaction volumes. IMS™ FP provides these application programs with rapid access to main-storage databases and to direct-access data entry databases. In IMS™ FP, message processing is grouped for load balancing and synchronized for database integrity and recovery.

With MADS, an IMS™ FP I/O operation is performed to every data storage device having an ADS and completion is confirmed to every data storage device before the IMS™ FP I/O operation itself is considered completed. Problems sometimes arise, however, when a data storage device takes too long to perform error recovery. This so-called "long-busy" condition might range from couple of seconds to several minutes. This can cause serious problems for an application program that has to remain in a wait-state for an I/O operation until the long-busy condition is resolved.

One solution is to time I/O operations to the data storage device. In this scenario, if a maximum acceptable duration of an I/O operation is exceeded, then the I/O operation is terminated and the data storage device is identified as unavailable. However, identifying the data storage device as unavailable could affect other application programs and the data storage device may have to be manually recovered.

Generically speaking, this problem exists for any higher level I/O operation used to keep multiple copies of data synchronized that directs I/O operations to multiple data storage devices and must have confirmation from all devices before the I/O higher level operation is considered successfully completed. Thus, there is a need in the art for improved techniques for handling long-busy conditions in an online transaction processing or database management system.

SUMMARY OF THE INVENTION

To overcome the limitations in the prior art described above, and to overcome other limitations that will become apparent upon reading and understanding the present specification, the present invention discloses a method, apparatus, and article of manufacture for resolving long-busy conditions for synchronized data sets. A long-busy condition is detected in a first one of the synchronized data sets. Further access to the first data set is prevented and all subsequent accesses are directed to another, available, second one of the data sets during the long-busy condition. All updates that are made to the second data set during the long-busy condition are identified and stored in a data structure. An untimed read operation is used to determine when the long-busy condition has cleared. Once the long-busy condition is cleared, the first data set is placed into a recovery mode, wherein the identified updates are applied to the first data set. During the recovery mode, the first data set is read-inhibited to prevent read accesses thereto, but the first data set is write-enabled to allow write access thereto. Upon completion of the recovery mode, the first and second data sets are re-synchronized and normal processing can resume.

Various advantages and features of novelty, which characterize the invention, are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings, which form a part hereof, and in which is shown by way of illustration a specific embodiment in which the invention may be practiced. It is to be understood that other embodiments may be utilized and structural changes may be made without departing from the scope of the present invention.

Overview

The preferred embodiment of the present invention provides a solution to a long-busy condition in an environment that accesses Multiple Area Data Sets (MADS) stored on multiple data storage devices. When one of the Area Data Sets (ADS) is detected as being in a long-busy condition, no further access is allowed to that ADS and all subsequent I/O operations are directed to only the ADS's in the MADS that remain operational. During the long-busy condition, all updates to the operational ADS's in the MADS are stored in a list structure. When the long-busy condition is over, the associated ADS is put into a long-busy recovery mode. Under the long-busy recovery mode, the ADS is "read-inhibited" but "write-enabled", so that the updates from the list structure are applied to the ADS, as are any normal updates that may occur during the pendency of the long-busy recovery mode. Once the long-busy recovery mode is completed and the ADS's are re-synchronized, the ADS's become available for normal processing and thus are both read- and write-enabled. As a result, the present invention provides the capability to manage the synchronization of multiple copies of data sets stored on different data storage devices following a temporary loss of access to any of the copies resulting from a recoverable condition.

Hardware and Software Environment

Figure 1:
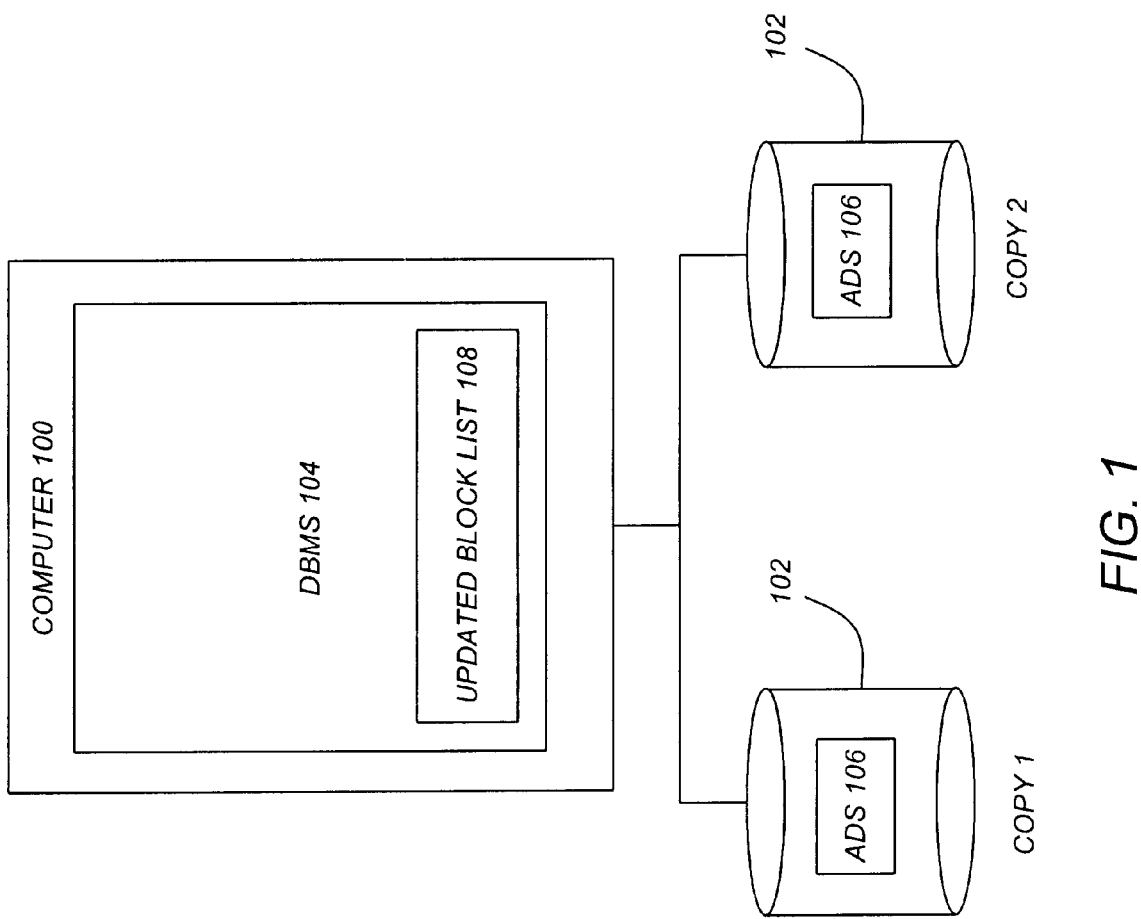
FIG. 1 is a block diagram illustrating an exemplary hardware and software environment used to implement the preferred embodiment of the invention.

FIG. 1 is a block diagram illustrating an exemplary hardware and software environment used to implement the preferred embodiment of the invention. A computer 100 is typically comprised of one or more processors, random access memory (RAM), read-only memory (ROM), and other components such as data storage devices 102 and data communications devices.

The computer 100 executes a database management system (DBMS) 104, which in the preferred embodiment comprises the Information Management System (IMS™) DBMS 104 sold by IBM Corporation, the assignee of the present invention. The IMS™ DBMS 104 manages at least one Area Data Set (ADS) 106, wherein the ADS 106 comprises at least a portion of one or more databases stored on one or more data storage devices 102. In the preferred embodiment, the database is a hierarchic collection of data, wherein information is organized in a pyramid fashion with data at each level of the hierarchy related to, and in some way dependent upon, data at the higher level of the hierarchy.

According to the preferred embodiment, the DBMS 104 manages Multiple Area Data Sets (MADS), which in the example of FIG. 1 comprise two copies of the same ADS 106. Copy 1 of the ADS 106 resides on a first data storage device 102 and copy 2 of the ADS 106 resides on a second data storage device 102. In this manner, read operations may be performed against either copy 1 or copy 2 of the ADS 106, whereas write operations are performed against both copy 1 and copy 2 of the ADS 106. These "mirrored" images of the ADS 106 provide for enhanced throughput for transactions processed by the DBMS 104.

An Updated Block List 108 is maintained in the memory of the computer 100 to ensure that both copy 1 and copy 2 of the ADS 106 can be synchronized after a failure or other error occurs on either copy of the ADS 106. This Updated Block List 108, and functions performed therewith, are described in more detail below.

Generally, these components 104, 106, and 108 all comprise logic and/or data that is embodied in or retrievable from a computer-readable device, medium, or carrier, e.g., a data storage device 102, a data communications device, a remote computer or device coupled to the computer 100 via a data communications device, etc. Moreover, this logic and/or data, when read, executed, and/or interpreted by the computer 100, causes the computer 100 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass logic and/or data accessible from any computer-readable device, carrier, or media.

Those skilled in the art will recognize many modifications may be made to this exemplary environment without departing from the scope of the present invention. For example, those skilled in the art will recognize that any combination of the above components, or any number of different components, including different logic, data, different peripherals, and different devices, may be used to implement the present invention, so long as similar functions are performed thereby. Specifically, those skilled in the art will recognize that the present invention may be applied to any database, associated database management system, or peripheral device.

Operation of the Preferred Embodiment

In the preferred embodiment, read operations against copy 1 and copy 2 of the ADS 106 are performed in a "round robin" fashion, wherein copy 1 is accessed for the first read operation, copy 2 is accessed for the second read operation, and the sequence is repeated for subsequent read operations. However, write operations update both copy 1 and copy 2 of the ADS 106, in order to ensure the synchronization of the two copies of the ADS 106.

Synchronization problems arise, however, if there is a temporary or permanent loss of access to either copy 1 or copy 2 of the ADS 106. For example, during a temporary loss of access to copy 2 of the ADS 106, write operations can be performed against copy 1 of the ADS 106, but cannot be performed against copy 2 of the ADS 2. This results in a lack of synchronization between the two copies of the ADS 106.

The preferred embodiment addresses these types of events where there is a temporary loss of access to one of the copies of the ADS 106 due to delays in a data storage device or subsystem. The temporary loss may result from excessive delays in performing operations against the ADS 106 where the response time of transactions being performed by the DBMS 104 are adversely affected. In such instances, access to one of the copies of the ADS 106 that causes delays ceases until the causes of the delays are resolved and the copy is re-synchronized with the remaining copy of the ADS 106.

For example, copy 2 of the ADS 106 may be de-activated and therefore unavailable during a temporary outage resulting from excessive delays in accessing the copy. The DBMS 104 continues to utilize only copy 1 of the ADS 106 for all read and write operations. After service to copy 2 of the ADS 106 has been restored to available status, the DBMS 104 resumes utilizing both copy 1 and copy 2 of the ADS 106.

In the preferred embodiment, outages are determined from I/O timing. The DBMS 104 provides a timing service for each I/O operation to each copy of the ADS 106, wherein each I/O operation has a time limit. When the time limit expires and the I/O operation has not completed to one of the copies of the ADS 106, the DBMS 104 declares that a temporary loss of service has occurred for the affected copy of the ADS 106 and the ADS 106 is unavailable. Thereafter, no further read or write operations are performed against that copy of the ADS 106 until service is restored, and thus the affected copy of the ADS 106 is considered unavailable. In this example, the remaining, available copy of the ADS 106 will be used exclusively for performing read and write operations.

After a temporary loss of service to a copy of the ADS 106 has occurred, the DBMS 104 needs to know when service can resume for the copy of the ADS 106. To accomplish this, the DBMS 104 issues an untimed read operation to the copy of the ADS 106 that has lost service. When the read operation completes, the DBMS 104 knows that service can be resumed to that copy of the ADS 106.

During the temporary loss of service, the DBMS 104 maintains the Updated Block List 108 in the memory of the computer 100. The Updated Block List 108 records the physical block numbers of every block that is updated on the available copy of the ADS 106. The Updated Block List 108 is then used for re-synchronization of the copy of the ADS 106 that has suffered the temporary loss of service when the loss of service is resolved.

When service is restored to the unavailable copy of the ADS 106, the blocks of data that were not written to the unavailable copy are recovered from the available copy of the ADS 106. The recovery steps involve processing each entry in the Updated Block List 108: (1) serializing access to the physical block on the available copy of the ADS 106, (2) reading the physical block from the available copy of the ADS 106, (3) writing the physical block to the unavailable copy of the ADS 106, and (4) releasing serialization to the physical block on the available copy of the ADS 106. After all entries in the Updated Block List 108 have been processed, the copies of the ADS 106 are re-synchronized and the unavailable copy of the ADS 106 is recovered and becomes available for normal processing. Thereafter, the "round robin" read operations and dual write operations are resumed for both available copies of the ADS 106.

Alternative Hardware and Software Environment

Figure 2:
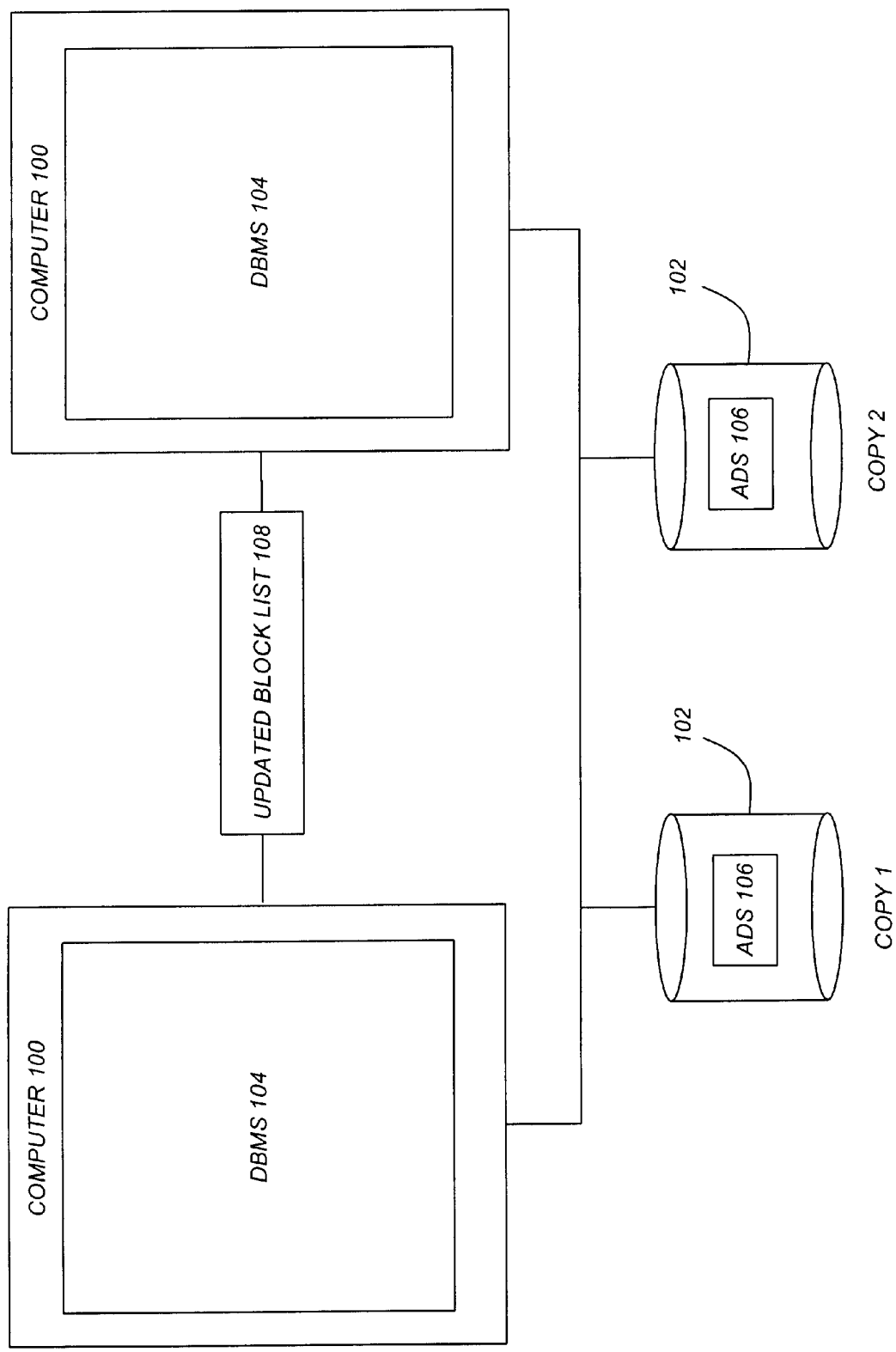
FIG. 2 is a block diagram illustrating an exemplary hardware and software environment used to implement an alternative embodiment of the invention.

FIG. 2 is a block diagram illustrating an exemplary hardware and software environment used to implement an alternative embodiment of the invention. In this embodiment, multiple computers 100 access shared data storage devices 102. In addition, the computers 100 each execute their own DBMS 104 that share one or more Multiple Area Data Sets (MADS) stored on the shared data storage devices 102. In the example of FIG. 2, the MADS comprises two synchronized copies of the same ADS 106. Copy 1 of the ADS 106 resides on a first shared data storage device 102 and copy 2 of the ADS 106 resides on a second shared data storage device 102. In this manner, read operations may be performed against either copy 1 or copy 2 of the ADS 106, whereas write operations are performed against both copy 1 and copy 2 of the ADS 206. These "mirrored" images of the ADS 106 provide for enhanced throughput for transactions processed by both of the DBMS's 104. An Updated Block List 108 is maintained in a memory device shared between the multiple computers 100 to ensure that both copy 1 and copy 2 of the ADS 106 can be synchronized after a failure or other error occurs on either copy of the ADS 106. These functions performed on this Updated Block List 108 are the same as those described above.

Logic of the Preferred Embodiment

Flowcharts which illustrate the logic of the DBMS 104 according to the preferred embodiment of the present invention are shown in FIGS. 3–8. Those skilled in the art will recognize that this logic is provided for illustrative purposes only and that different logic may be used to accomplish the same results.

Figure 3:
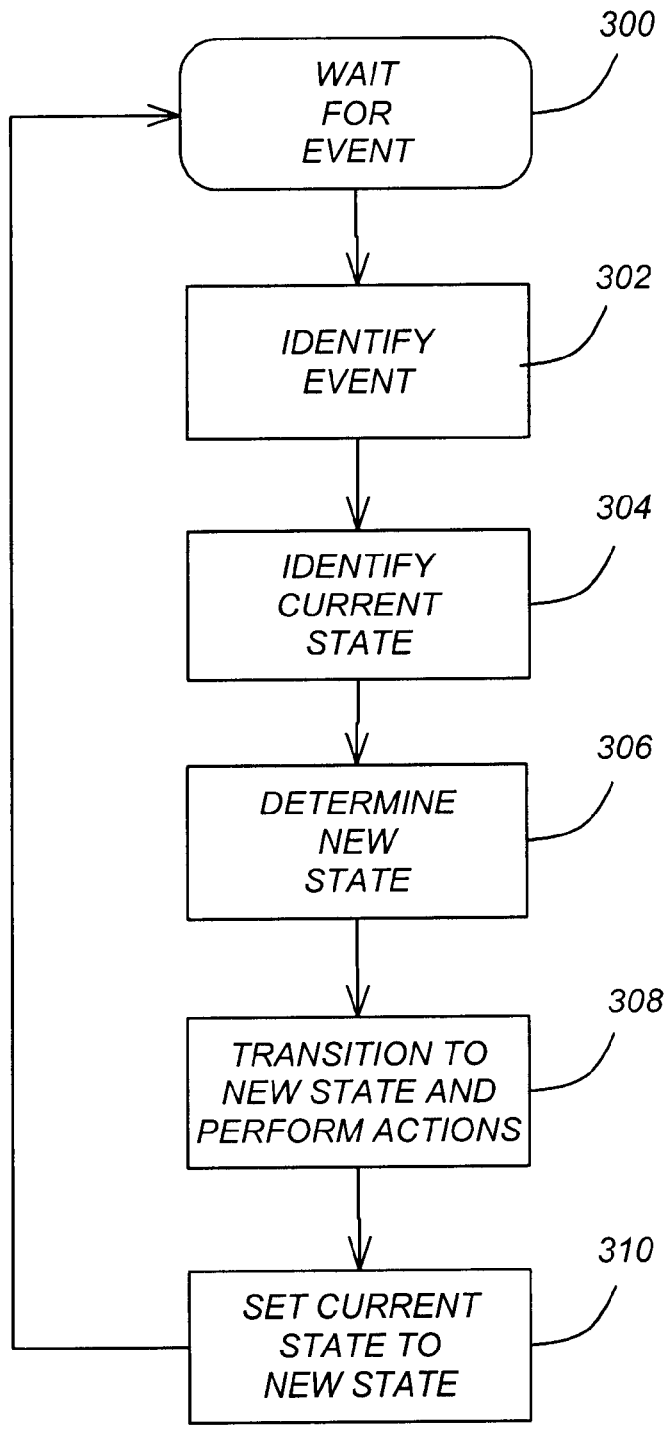
FIG. 3 is a flowchart that illustrates the general logic of a message or event-driven database management system performing the steps of the preferred embodiment of the present invention.

FIG. 3 is a flowchart that illustrates the general logic of a message or event-driven DBMS 104 performing the steps of the preferred embodiment of the present invention. In such a DBMS 104, operations are performed when transitions are made, based upon the receipt of messages or events, from present or current states to new states.

Generally, the flowchart begins by waiting at block 300 for an event to occur (e.g., a hardware or software interrupt). When an event occurs, control passes to block 302 to identify the event. Based upon the event, as well as the current state of the DBMS 104 determined in block 304, a new state is determined in block 306. In block 308, the logic transitions to the new state and performs any actions required for the transition. In block 310, the current state is set to the previously determined new state, and control returns to block 300 to wait for more input events.

The specific operations that are performed by block 308 when transitioning between states will vary depending upon the current state and the event. The various operations required to implement and maintain the preferred embodiment of the present invention represent particular events handled by the logic. However, it should be appreciated that these operations represent merely a subset of all of the events handled by the computer 100.

Figure 4:
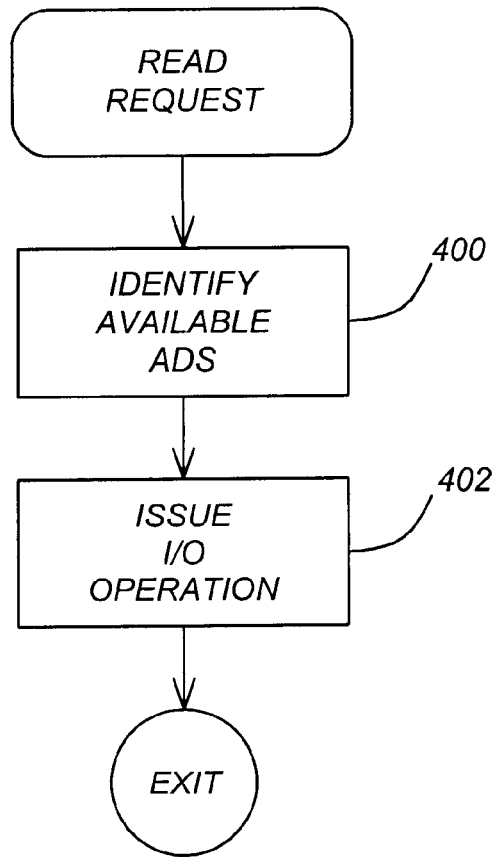
FIG. 4 is a flowchart that illustrates the general logic that is performed whenever a read request is made in the database management system according to the preferred embodiment of the present invention.

FIG. 4 is a flowchart that illustrates the general logic that is performed whenever a read request is made in the DBMS 104 according to the preferred embodiment of the present invention.

Block 400 represents the DBMS 104 identifying an available ADS 106 using, for example, a round robin approach among all available ADS's 106. In this example, an ADS 106 is identified as being available when a READ flag associated with the ADS 106 is set and unavailable when the READ flag is cleared.

Block 402 represents the DBMS 104 issuing an I/O operation against the identified available ADS 106.

Thereafter, the logic terminates at Block 404.

Figure 5:
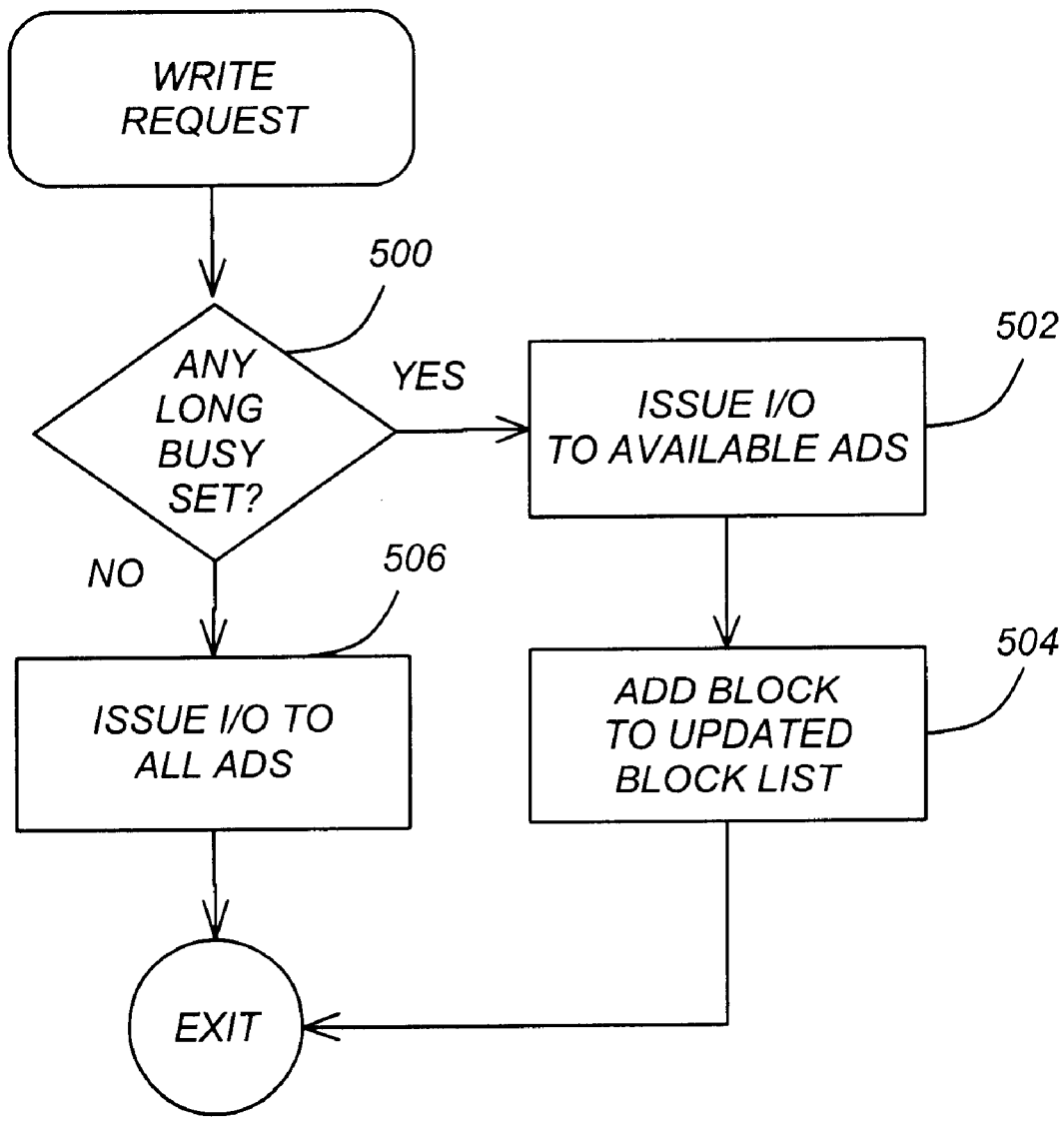
FIG. 5 is a flowchart that illustrates the general logic that is performed whenever a write request is made in the database management system according to the preferred embodiment of the present invention.

FIG. 5 is a flowchart that illustrates the general logic that is performed whenever a write request is made in the DBMS 104 according to the preferred embodiment of the present invention.

Block 500 is a decision block that represents the DBMS 104 determining whether any ADS 106 has a LONG-BUSY flag set indicating that a long-busy condition exists for the ADS 106. If so, control transfers to Block 502; otherwise, control transfers to Block 506.

Block 502 represents the DBMS 104 issuing I/O operations against all available ADS's 106 in the MADS; on the other hand, I/O operations cannot be issued against unavailable ADS's 106. In this example, an ADS 106 is identified as being available when a WRITE flag associated with the ADS 106 is set and unavailable when the WRITE flag is cleared.

Block 504 represents the DBMS 104 adding the block from the write request to the Updated Block List 108.

Block 506 represents the DBMS issuing I/O operations against all ADS's 106 in the MADS, in order to ensure that the all ADS's 106 remain synchronized.

Thereafter, the logic terminates.

Figure 6:
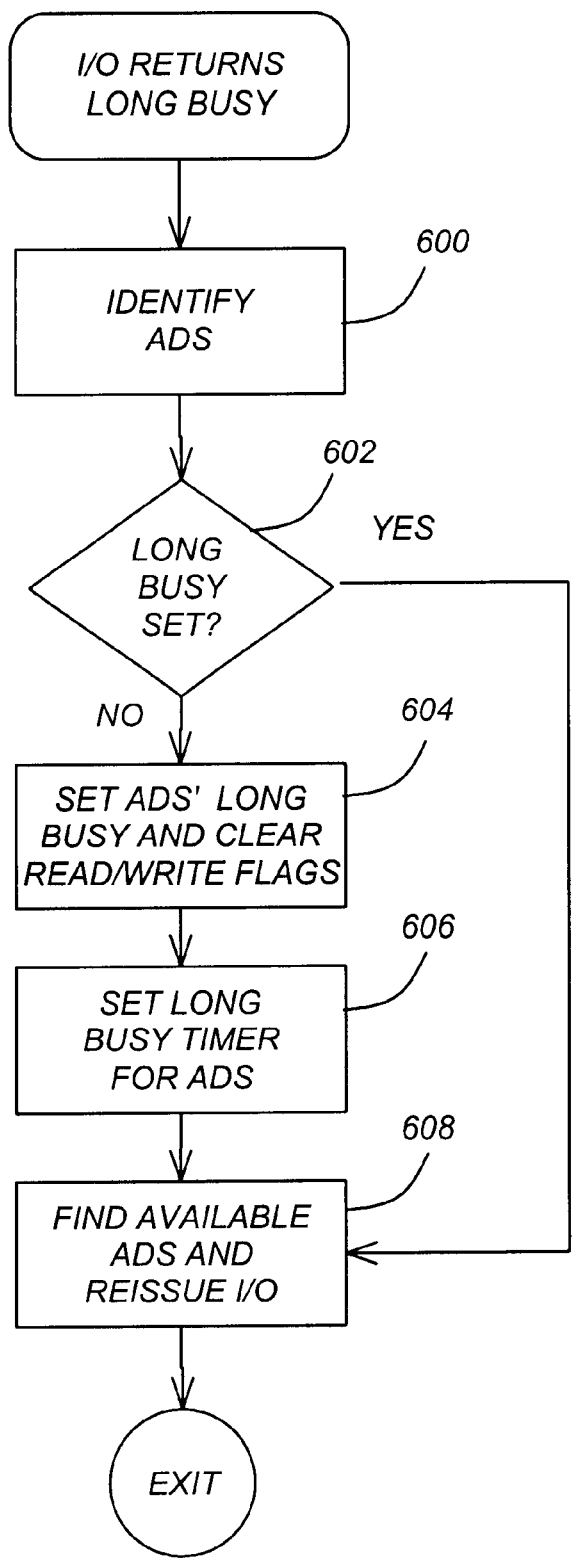
FIG. 6 is a flowchart that illustrates the general logic that is performed whenever an input/output (I/O) operation by the database management system returns an indication of a "long-busy" condition according to the preferred embodiment of the present invention.

FIG. 6 is a flowchart that illustrates the general logic that is performed whenever an I/O operation (e.g., a read or write request) by the DBMS 104 returns an indication of a "long-busy" condition according to the preferred embodiment of the present invention.

Block 600 represents the DBMS 104 identifying the ADS 106 associated with the long-busy condition.

Block 602 is a decision block that represents the DBMS 104 determining whether the LONG-BUSY flag associated with the ADS 106 has been set. If not, control transfers to Block 604; otherwise, control transfers to Block 608.

Block 604 represents the DBMS 104 setting the LONG-BUSY flag associated with the ADS 106, and clearing both the READ flag and WRITE flag associated with the ADS 106.

Block 606 represents the DBMS 104 setting a LONG-BUSY timer associated with the ADS 106.

Block 608 represents the DBMS 104 finding another available ADS 106 and re-issuing the I/O operation against the identified available ADS 106. As noted above, an ADS 106 is identified as being available for a write request when a WRITE flag associated with the ADS 106 is set and an ADS 106 is identified as being available for a read request when a READ flag associated with the ADS 106 is set.

Thereafter, the logic terminates.

Figure 7:
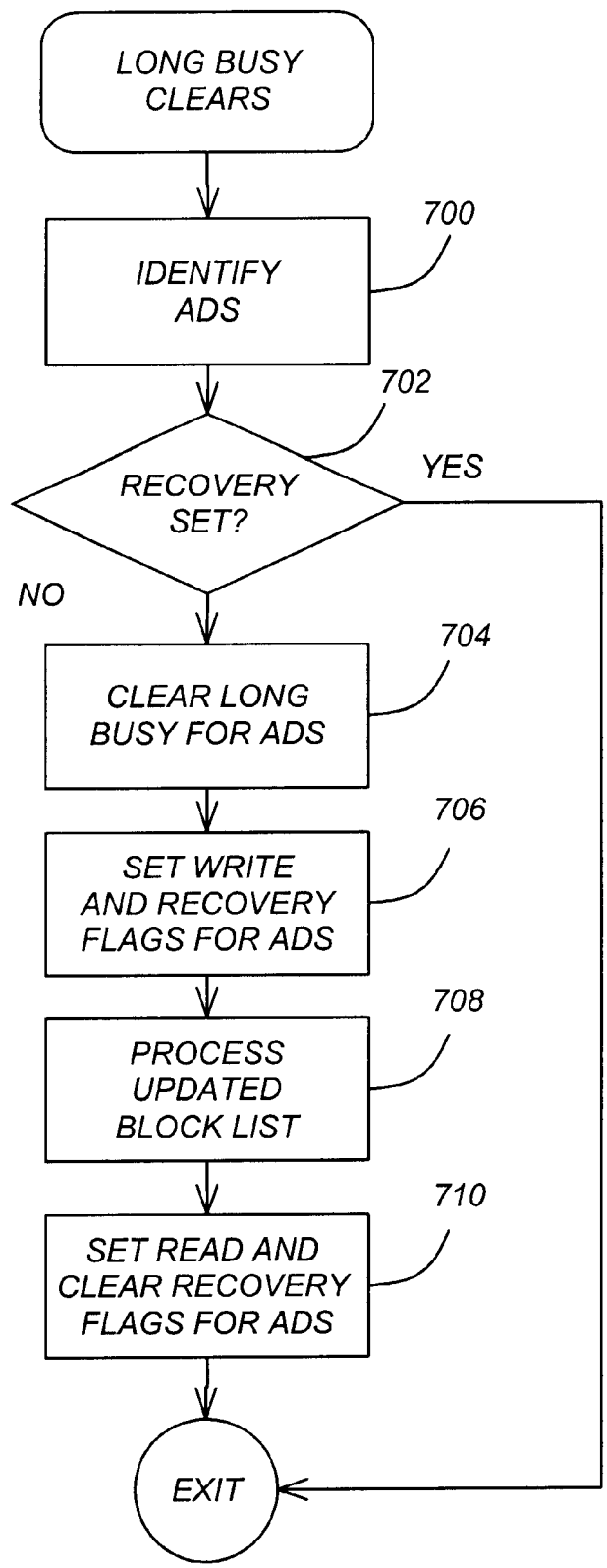
FIG. 7 is a flowchart that illustrates the general logic that is performed whenever the database management system determines that the long-busy condition of the area data set has been cleared according to the preferred embodiment of the present invention.

FIG. 7 is a flowchart that illustrates the general logic that is performed whenever the DBMS 104 determines that the long-busy condition of the ADS 106 has been cleared according to the preferred embodiment of the present invention.

Block 700 represents the DBMS 104 identifying the ADS 106 associated with the long-busy condition.

Block 702 is a decision block that represents the DBMS 104 determining whether the RECOVERY flag associated with the ADS 106 has been set. If not, control transfers to Block 704; otherwise, the logic terminates.

Block 704 represents the DBMS 104 clearing the LONG-BUSY flag associated with the ADS 106.

Block 706 represents the DBMS 104 setting both the WRITE and RECOVERY flags associated with the ADS 106. Setting the WRITE flag allows write requests to proceed against the ADS 106 while recovery of the ADS 106 is underway.

Block 708 represents the DBMS 104 processing the Updated Block List 108 in order to apply the blocks stored therein against the ADS 106. This step re-synchronizes the ADS 106 with the other ADS's 106 in the MADS. Upon completion, the Updated Block List 108 is cleared.

Block 710 represents the DBMS 104 setting the READ flag and clearing the RECOVERY flag associated with the ADS 106. Setting the READ flag allows read requests to proceed against the ADS 106, since recovery of the ADS 106 has completed.

Thereafter, the logic terminates.

Figure 8:
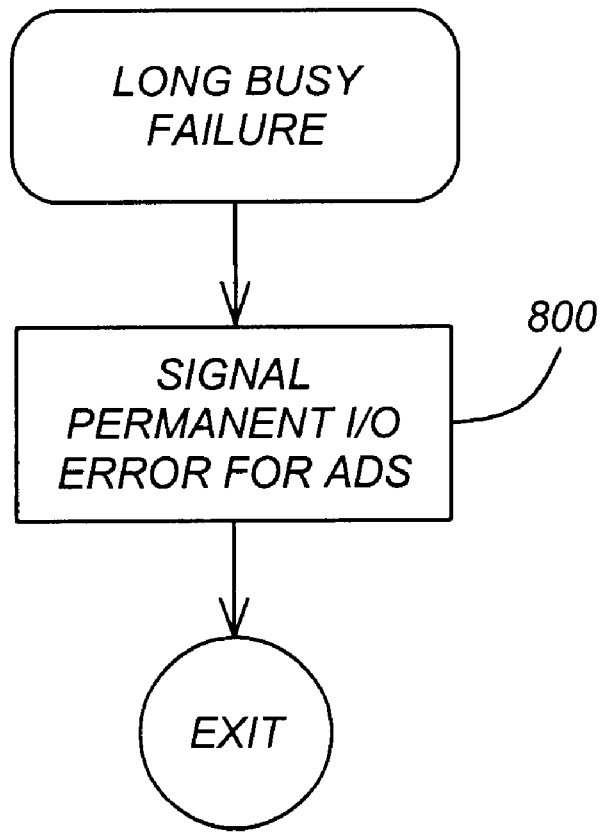
FIG. 8 is a flowchart that illustrates the general logic that is performed whenever the database management system determines that the long-busy condition of the area data set has not been cleared and a failure has occurred according to the preferred embodiment of the present invention.

FIG. 8 is a flowchart that illustrates the general logic that is performed whenever the DBMS 104 determines that the long-busy condition of the ADS 106 has not been cleared and a failure has occurred according to the preferred embodiment of the present invention. This determination may occur, for example, when the LONG-BUSY timer set in FIG. 6 expires without the LONG-BUSY condition being cleared.

Block 800 represents the DBMS 104 signaling that the ADS 106 associated with the long-busy condition has been identified as a permanent I/O error.

Thereafter, the logic terminates.

Conclusion

This concludes the description of the preferred embodiment of the invention. The following describes some alternative methods of accomplishing the same objects.

In alternative embodiments of the present invention, other types and configurations of computers could be used. For example, mainframes, minicomputers, workstations, or personal computers, could be used with the present invention.

In alternative embodiments of the present invention, other types and configurations of computer programs could be used. For example, the invention need not be restricted to client-server configurations.

In alternative embodiments of the present invention, other database management systems could be used. For example, the invention need not be restricted to IMS™ database management systems and databases.

In summary, the present invention discloses a method, apparatus, and article of manufacture for resolving long-busy conditions for synchronized data sets. A long-busy condition is detected in a first one of the synchronized data sets. Further access to the first data set is prevented and all subsequent accesses are directed to another, available, second one of the data sets during the long-busy condition. All updates that are made to the second data set during the long-busy condition are identified and stored in a data structure. An untimed read operation is used to determine when the long-busy condition has cleared. Once the long-busy condition is cleared, the first data set is placed into a recovery mode, wherein the identified updates are applied to the first data set. During the recovery mode, the first data set is read-inhibited to prevent read accesses thereto, but the first data set is write-enabled to allow write access thereto. Upon completion of the recovery mode, the first and second data sets are re-synchronized and normal processing can resume.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for resolving long-busy conditions in synchronized data sets, comprising:

(a) managing at least first and second synchronized data sets in at least one computer system;

(b) detecting a long-busy condition for the first data set;

(c) preventing further access to the first data set and directing all subsequent accesses to the second data set during the long-busy condition;

(d) identifying all updates made to the second data set during the long-busy condition;

(e) detecting that the long-busy condition for the first data set has cleared when an untimed operation on the first data set completes; and (f) applying the identified updates to the first data set when the long-busy condition has cleared, so that the first and second data sets are synchronized.

2. The method of claim 1, wherein the applying step comprises performing a recovery on the first data set, wherein the first data set is read-inhibited but write-enabled, so that the identified updates are applied to the first data set as are any other updates that may occur while the recovery is being performed.

3. The method of claim 1, wherein the first data set becomes available for normal processing after the first and second data sets are synchronized.

4. The method of claim 1, wherein the first and second data sets each comprise Area Data Sets (ADS).

5. The method of claim 1, wherein the identified updates are stored in a data structure in a memory of the computer.

6. The method of claim 1, further comprising identifying the first data set as having a permanent error when the long-busy condition fails to clear.

7. The method of claim 1, wherein the detecting step comprises detecting the long-busy condition for the first data set when a time limit for an operation on the first data set expires without completion of the operation.

8. The method of claim 1, wherein multiple computers perform steps (a)–(f) in a coordinated manner.

9. A computer-implemented apparatus for resolving long-busy conditions in synchronized data sets, comprising:
  (a) at least one computer having a plurality of data storage devices connected thereto, wherein each of data storage devices stores at least one data set;
  (b) at least one database management system, executed by the computer, for managing the data sets stored on the data storage devices, wherein the database management system comprises:
    (1) means for managing at least first and second synchronized data sets;
    (2) means for detecting a long-busy condition for the first data set;
    (3) means for preventing further access to the first data set and directing all subsequent accesses to the second data set during the long-busy condition;
    (4) means for identifying all updates made to the second data set during the long-busy condition;
    (5) means for detecting that the long-busy condition for the first data set has cleared when an untimed operation on the first data set completes; and
    (6) means for applying the identified updates to the first data set when the long-busy condition clears, so that the first and second data sets are synchronized.

10. The apparatus of claim 9, wherein the means for applying comprises means for performing a recovery on the first data set, wherein the first data set is read-inhibited but write-enabled, so that the identified updates are applied to the first data set as are any other updates that may occur while the recovery is being performed.

11. The apparatus of claim 9, wherein the first data set becomes available for normal processing after the first and second data sets are synchronized.

12. The apparatus of claim 9, wherein the first and second data sets each comprise Area Data Sets (ADS).

13. The apparatus of claim 9, wherein the identified updates are stored in a data structure in a memory of the computer.

14. The apparatus of claim 9, further comprising means for identifying the first data set as having a permanent error when the long-busy condition fails to clear.

15. The apparatus of claim 9, wherein the means for detecting comprises means for detecting the long-busy condition for the first data set when a time limit for an operation on the first data set expires without completion of the operation.

16. The apparatus of claim 9, wherein multiple computers perform means (1)–(6) in a coordinated manner.

17. An article embodying logic for resolving long-busy conditions in synchronized data sets, the logic comprising:
  (a) managing at least first and second synchronized data sets in at least one computer system;
  (b) detecting a long-busy condition for the first data set;
  (c) preventing further access to the first data set and directing all subsequent accesses to the second data set during the long-busy condition;
  (d) identifying all updates made to the second data set during the long-busy condition;
  (e) detecting that the long-busy condition for the first data set has cleared when an untimed operation on the first data set completes; and
  (f) applying the identified updates to the first data set when the long-busy condition has cleared, so that the first and second data sets are synchronized.

18. The article of manufacture of claim 17, wherein the applying step comprises performing a recovery on the first data set, wherein the first data set is read-inhibited but write-enabled, so that the identified updates are applied to the first data set as are any other updates that may occur while the recovery is being performed.

19. The article of manufacture of claim 17, wherein the first data set becomes available for normal processing after the first and second data sets are synchronized.

20. The article of manufacture of claim 17, wherein the first and second data sets each comprise Area Data Sets (ADS).

21. The article of manufacture of claim 17, wherein the identified updates are stored in a data structure in a memory of the computer.

22. The article of manufacture of claim 17, further comprising identifying the first data set as having a permanent error when the long-busy condition fails to clear.

23. The article of manufacture of claim 17, wherein the detecting step comprises detecting the long-busy condition for the first data set when a time limit for an operation on the first data set expires without completion of the operation.

24. The article of manufacture of claim 17, wherein multiple computers perform steps (a)–(f) in a coordinated manner.

* * * * *